United States Patent [19]

Townsend

[11] 4,017,202

[45] Apr. 12, 1977

[54] BORING TOOL WITH VARIABLE EXTENSION

[76] Inventor: Robert E. Townsend, 9442 E. Pentland St., Temple City, Calif. 91780

[22] Filed: Oct. 20, 1975

[21] Appl. No.: 624,224

[52] U.S. Cl. .............................. 408/226; 408/705; 403/308

[51] Int. Cl.² .............................. B23B 51/00

[58] Field of Search .......... 408/226, 705, 199, 239; 403/299, 300, 301, 305, 306, 308; 81/177 A

[56] References Cited

UNITED STATES PATENTS

| | | | |
|---|---|---|---|
| 1,018,172 | 2/1912 | Downs | 81/177 A |
| 1,225,209 | 5/1917 | Beaulieu | 408/239 |
| 2,752,965 | 7/1956 | Mackey | 408/226 X |
| 3,865,502 | 2/1975 | Hamann | 408/226 |

*Primary Examiner*—Gil Weidenfeld
*Attorney, Agent, or Firm*—Whann & McManigal

[57] ABSTRACT

A boring tool with a variable length extension formed by a standard piece of pipe, for particular use in drilling downwardly from a wall studding header and through a fire brake bracing member which extends between the wall studs below the header, to facilitate the installation of piping, electric conduits, and the like, wherein a standard piece of pipe is threadedly connected by a coupling member at one end to a first shank portion of a boring tool, and a coupling member at its opposite end to an axially aligned second shank adapted for connection with a driving instrumentality. The coupling member in a modified form is provided at its pipe connection end with internally stepped threaded portions for selective connection with the ends of pipes of different diameter.

4 Claims, 4 Drawing Figures

BORING TOOL WITH VARIABLE EXTENSION

PRIOR ART

In the prior art there are numerous boring tools with various types of manufactured extensions which can be utilized to extend the tool length for deep boring operations. The disclosed embodiments are expensive and require a stock inventory to meet different requirements. The closest art known to applicant are the following patents:

U.S. Pat. No. 1,191,717—July 18, 1916,
U.S. Pat. No. 2,325,535—July 27, 1943,
U.S. Pat. No. 2,370,706—Mar. 6, 1945,
U.S. Pat. No. 2,954,712—Oct. 4, 1960,
U.S. Pat. No. 3,169,417—Feb. 16, 1965,
U.S. Pat. No. 3,353,437—Nov. 21, 1967,
Italian Pat. No. 503,208—Dec. 4, 1954.

BACKGROUND OF THE INVENTION

The present invention relates generally to a boring tool.

The installation of pipes, conduits, and the like, in the walls of completed dwellings and other buildings presents a problem where it becomes necessary to carry the conduit, or similar member, through fire brake bracing which extends between adjacent wall studs. It is of course possible in such situations to break out the wall at the position of the fire brake, so as to permit the making of an appropriate opening therein for the passage of the pipe or other member. However, this procedure becomes a very expensive undertaking, as will be appreciated.

Another approach is to attempt to utilize a long drill bit for drilling through the studding header above the fire brake bracing member in order to reach the bracing member and drill a hole therethrough. The difficulty with this procedure is that sufficiently long drill bits or the utilization of manufactured extensions such as disclosed in the above-noted prior art patents becomes very expensive, and such extensions are not ordinarily available in appropriate lengths which would permit reaching the fire brake.

From the above, it will be appreciated that a real need arises for a cheap and economical extension for a boring tool which can be used by the home handyman as well as professional tradesman, such as plumbers and electricians, and which can be provided to meet various length requirements, on the job, to adapt the boring tool for different boring lengths, by the utilization of means which are ordinarily being utilized in the installation.

SUMMARY OF THE INVENTION

The present invention relates generally to a boring tool, and is more particularly concerned with novel means for providing an extension for a boring tool such as a wood bit, which comprises the use of a relatively inexpensive piece of standard pipe material.

It is one object of the herein described invention to provide a unique boring tool which is susceptible of length variation, on the job, by the use of material which is being utilized in the particular installation, and wherein the shank of the boring tool may be extended, for example, by means of a relatively inexpensive piece of standard pipe material.

A further object is to provide a boring tool according to the foregoing object, wherein the pipe extension is connected by means of a coupling of unique construction having one end fabricated for the endwise reception of the tool shank, and arranged for securement to the shank in a manner to prevent relative rotation thereof.

Another object is to provide as an article of manufacture, a unique coupling which can be sold in kit form with the boring tool, and which will enable inexpensive conversion of the boring tool or bit into one having an elongated extended shank, simply by the utilization of a desired length of a piece of standard pipe material.

The above objects and features are obtained by the provision of a unique coupling member having one end which is fabricated for endwise reception of the shank of the boring tool, the shank being secured in the coupling member by suitable means, such as a set screw. The other end of the coupling is provided with internal threads which permit it to be connected to one end of a threaded pipe member which serves as a spacer extension. A similar coupling is utilized for connecting the other end of the pipe extension to a second shank member by means of which the tool may be connected to a driving instrumentality.

Further objects and features of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF SEVERAL EMBODIMENTS

Figure 1:
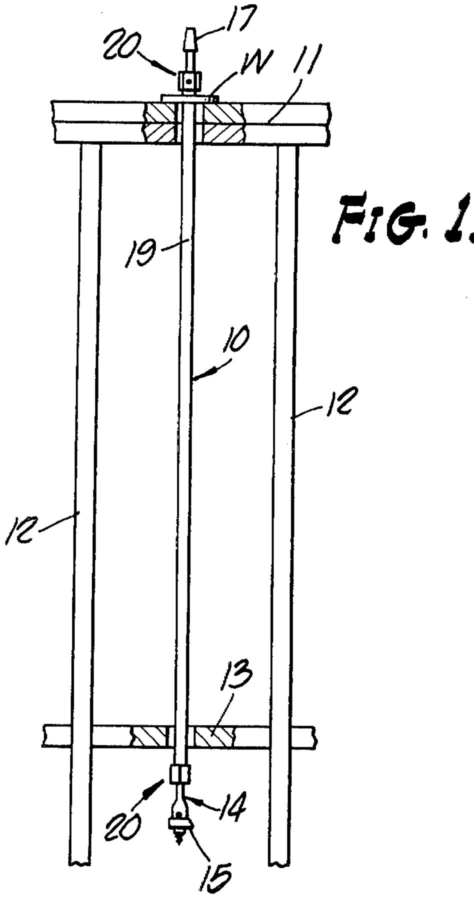
FIG. 1 is a view diagrammatically illustrating a boring tool embodying the features of the present invention for the drilling of a fire brake extending between a pair of wall studs.

Referring now specifically to the drawings, for illustrative purposes, FIG. 1 diagrammatically shows the manner of utilizing a boring tool, as generally indicated by the numeral 10, for boring through a studding header 11 at the top of adjacent wall studs 12—12, and a lower fire brake bracing member 13 bridging the space between the adjacent studs.

Figure 2:
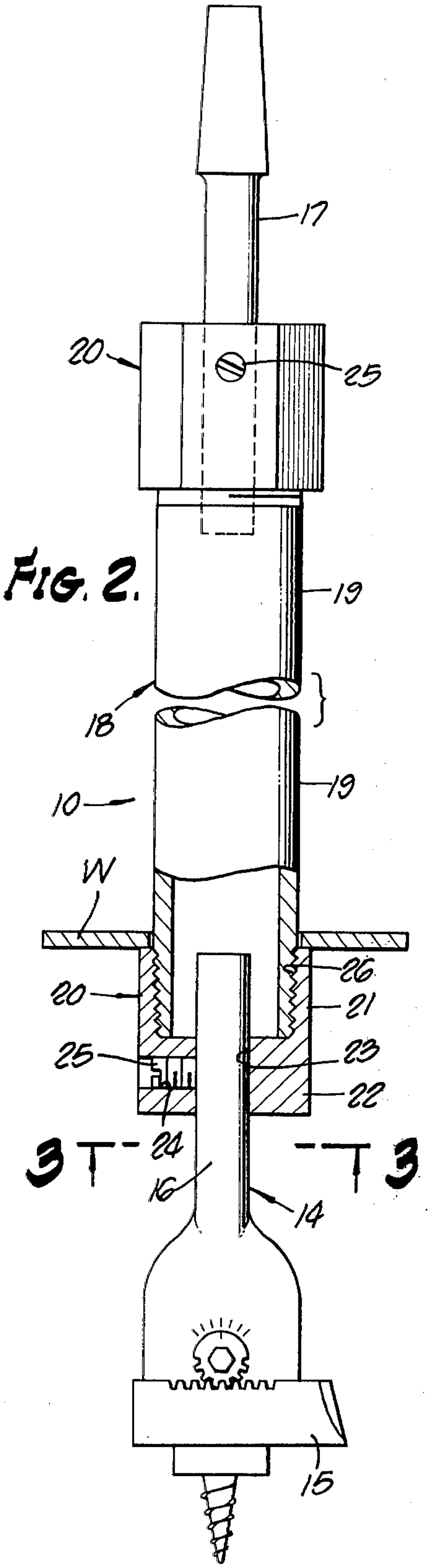
FIG. 2 is an enlarged fragmentary elevational view of a boring tool having an extension according to the present invention, a portion being in section to disclose the securing components of the connection coupling for the associated tool shank.

Referring now more specifically to FIG. 2, the boring tool 10 is shown as comprising a drilling bit 14 of conventional construction, and in this instance comprising an adjustble cutter 15 which is operatively associated with an axially extending first shank portion 16. In spaced axial alignment, and at the uppermost end of the tool, there is provided a second shank portion 17 adapted for connection with a driving instrumentality (not shown). The first shank portion 16 and the second shank portion 17 are interconnected by means of an elongated spacer extension structure, as generally indicated by the numeral 18.

It is a primary feature of the present invention that the extension 18 comprises a relatively inexpensive length of pipe 19, which can be made of any desired length and may constitute a piece of pipeing such as may be utilized in a particular installation. Such a pipe extension is not only economical but eliminates any waste.

As shown in FIG. 2, the utilization of such pipe material for the extension is made possible primarily by the provision of a pair of similarly constructed couplings, as generally indicated at 20, which permit connection of the pipe ends with the respective shank portions 16 and 17.

Each of the couplings 20, in the form shown in FIG. 2, comprises a generally elongate body 21 of tubular configuration, which is fabricated to provide an annular wall 22 at one end. The wall 22 is provided with an axial bore 23 of appropriate diameter to receive endwise therein the shank portion 16 or shank portion 17. The annular wall 22 is also provided with a radially extending threaded bore 24 adapted to operatively receive an appropriate set screw 25 which can be tightened against the inserted shank and thus secure the shank against relative rotation within the coupling.

Figure 3:
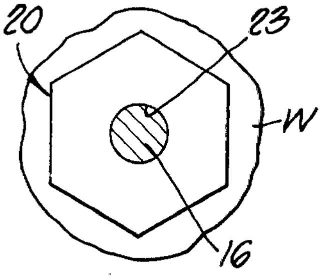
FIG. 3 is a transverse sectional view, taken substantially on line 3—3 of FIG. 2.

At its opposite end the coupling 20 is provided with an enlarged bore portion which is internally threaded, as indicated at 25, to permit threaded engagement with the adjacent threaded end of the pipe 19. As shown in FIG. 3, the outer periphery of the body 21 may be made multi-sided or otherwise formed for the reception of an appropriate tool for tightening the coupling on the end of the connected pipe.

As a safety measure, the tool is provided with a washer W which is mounted on the pipe 19 between the couplings 20. This washer has an internal diameter which is less than the diameter of the outer perimeter of the coupling, and an outer diameter which is greater than the maximum diameter of the hole which would ordinarily be drilled by the drilling bit. As thus arranged, the washer W is free to move along the pipe as the drilling progresses, but in the event that the shank portion 17 should for some reason become disengaged from the driving instrumentality, then abutment of the washer against the upper coupling would prevent the tool from dropping through the hole drilled in the studding header 11 into a position between the studding from which its recovery could present a serious problem.

Figure 4:
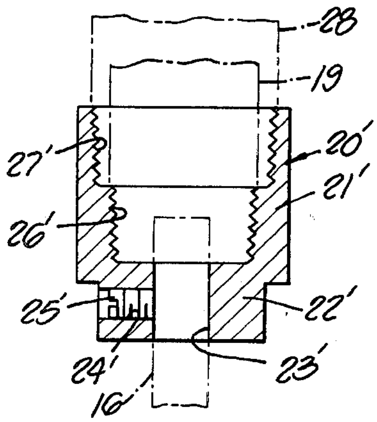
FIG. 4 is a sectional view showing a modified coupling adapted for selective connection with pipes of different diameters.

A coupling of modified construction is disclosed in FIG. 4, as indicated by the numeral 20′, and wherein similar elements have been indicated by primed numerals.

The modified coupling structure differs primarily from that shown in FIG. 2 in that the opposite end of the coupling is provided with internally threaded stepped bores 26′ and 27′ to permit the selective use of pipes of different diameters. For example, the threaded bore 26′ may be connected with the threaded end of a standard ½-inch pipe or conduit 19, while the internally threaded bore 27′ may be connected with the threaded end of a standard ¾-inch pipe or conduit 28. These pipe sizes comprise those usually utilized in the conventional plumbing or electrical system.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned.

I claim:

1. A boring tool, comprising, in combination:

a. a rotatable cutter having an axially extending shank portion;

b. a coupling member having an axial bore at one end for the endwise reception of said shank portion;

c. means for releasably securing the received shank portion against rotation is said bore; and d. an opposite end on said coupling member which is internally stepped and threaded for selective threaded connection with pipes of different diameter.

2. A variable length boring tool comprising:

a. a rotatable cutter having a connected first shank portion;

b. a separate second shank portion adapted for connection with a driving instrumentality;

c. an elongate spacer member;

d. means at one end of said spacer member for connecting said spacer member and said first shank portion in axial alignment;

e. means at an opposite end of said spacer member for connecting said spacer member and said second shank portion in axial alignment, comprising:

1. a coupling member having one end threadedly engaged with an end of the spacer member, and an opposite end containing an axial bore for the endwise reception of the second shank portion, and
2. means for releasably securing the received shank portion against relative rotation in said bore; and f. an abutment washer supported on said spacer member for free axial movement thereof, said washer having an internal diameter less than the outer diameter of said coupling member, and an outer diameter greater than the maximum diameter of the hole to be drilled by the rotatable cutter.

3. A variable length boring tool comprising:

a. a rotatable cutter having a connected first shank;

b. a separate second shank adapted for connection with a driving instrumentality;

c. a pair of coupling member for respectively connecting said first and second shanks in axial alignment with the opposite threaded ends of an elongated pipe, each of said coupling members comprising:

1. an elongate body of generally tubular configuration,
2. said body having an axial bore for reception of one of said shanks,
3. a set screw threadingly received in the annular wall forming said bore to releasably secure the associated shank in said bore; and
4. said body having a counterbore concentric with said bore, and said counterbore having an annular internally threaded wall for threaded connection with a threaded end of said pipe.

4. A variable length boring tool according to claim 3, in which the elongate body of each of said coupling members is multi-sided on its outer periphery for the reception of an appropriate tool to permit tightening of the connection with the associated pipe end with a minimum of surface damage to the coupling.

* * * * *